United States Patent [19]

Serageldin et al.

[11] Patent Number: 4,952,931
[45] Date of Patent: Aug. 28, 1990

[54] SIGNAL ADAPTIVE PROCESSOR

[76] Inventors: Ahmedelhadi Y. Serageldin, 21 Maplewood St., West Rox, Mass. 02132; Mostafa E. Ahmed, King Fahd Univ. of Petroleum and Minerals, Dhahran 31261, Saudi Arabia

[21] Appl. No.: 161,462

[22] Filed: Feb. 26, 1988

Related U.S. Application Data

[63] Continuation-in-part of Ser. No. 16,203, Jan. 27, 1987, abandoned.

[51] Int. Cl.$^5$ ............................................. G08G 1/00
[52] U.S. Cl. .................................... 340/902; 340/901; 381/43
[58] Field of Search ...................... 340/901, 902, 943; 381/43, 46

[56] References Cited

U.S. PATENT DOCUMENTS

| | | | |
|---|---|---|---|
| 4,158,190 | 6/1979 | Stefanov | 340/902 |
| 4,212,085 | 7/1980 | Vaillancour et al. | 367/909 X |
| 4,239,936 | 12/1980 | Sakoe | 381/43 X |
| 4,587,522 | 5/1986 | Warren | 340/902 |
| 4,591,834 | 5/1986 | Kyle | 340/566 |
| 4,668,941 | 5/1987 | Davenport et al. | 340/566 X |
| 4,720,802 | 1/1988 | Damaulakis et al. | 381/43 X |
| 4,720,864 | 1/1988 | Tajima et al. | 381/43 |

*Primary Examiner*—Joseph A. Orsino
*Assistant Examiner*—Jeffery A. Hofsass

[57] ABSTRACT

A signal adaptive processor for detecting and identifying specific sound signals that are emitted by relatively moving or at rest sources in noisy environments. The system can provide an early warning system to alert vehicle operators of the presence of emergency vehicles which emit audio warning signals to indicate the type of vehicle and the direction form which it is coming. The processing technique used here is similar to some word-spotting algorithms used in recognition of specific words in continuous speech, however the algorithm has been modified by the inventors to meet the particular characteristics of the specific sounds. The algorithm is also enhanced by a novel adaptive filtering means which identifies the background noise features and then filters it out before extracting the features of the sound in the incoming signal stream. This feature is essential to ensure reliable operation in such noisy environments such as streets and highways.

3 Claims, 6 Drawing Sheets

SIGNAL ADAPTIVE PROCESSOR

CROSS REFERENCE TO RELATED DOCUMENTS AND APPLICATIONS

This application is a continuation-in-part of U.S. patent application Ser. No. 16,203 filed on Jan. 27, 1987 now abandoned. Reference to disclosure document No. 134434, entitled Siren Sonic Sensor (S.S.S.).

BACKGROUND OF THE INVENTION

1. Field of the Invention

This invention relates to sound recognition. The invention detects and identifies the nature of particular sound patterns in noisy environments. In a preferred embodiment the invention is utilized as an early warning-system to alert vehicles operators of the presence of emergency vehicles which emit audio warning signals of a particular pattern. The concept that furnishes the background of the invention requires a closer look to how we view a traffic system.

On the physical level a traffic system is a network of roads, moving vehicles and pedestrians, all subject to changing conditions. The motion of vehicles and pedestrians along the roads is controlled by a set of regulations that constrain their motion, thus giving rise to an ordered state of affairs. Occasionally the ordered state is destroyed and a transition to a disordered state occurs. This could be due to unexpected changes in the road conditions which depend on the nature of the roads, the weather conditions, the functioning state of the traffic light systems, the presence of accidents, the appearance of emergency vehicles such as Police or Ambulance, and/or unexpected changes in the drivers conditions that depend on their state of awareness and their vehicle level of performance. The changes in the road and/or drivers conditions happen randomly and therefore are unexpected and that is due to lack of information. Usually drivers cannot predict with certainty what other drivers are expected to do, and so they drive almost independently of one another but of course all drive to some degree under constrain. The same applies to the road conditions. Thus a traffic system is a complex structure, made up of interacting subsystems that involve deterministic as well as stochastic processes.

The deterministic processes are of mechanistic nature which controls the traffic motion thus giving rise to order which is the normal traffic state and that is manifested by the traffic regulations and monitors. On the other hand the stochastic processes are of chaotic nature which destroys order hence increasing the accidents rate and that is manifested by the lack of information present in the traffic system.

Enhancing the level of safety in a traffic system i.e. to lower the accidents rate requires suppression of the degree of disorder which implies raising the level of information among the various interacting subsystems. To accomplish this drivers should be informed ahead of time of situations to be, of particular road or zone conditions that will be encountered, to prepare to change their course of motion regarding speed and/or direction. Practically in some situations road signs and light signals can achieve that goal but in other situations to be mentioned subsequently, these methods cannot do any help.

Most drivers response to sudden changes in normal traffic situations is limited by the driver's state of awareness that mainly depends on the vision and hearing abilities, the speed in making decisions which is drastically slowed down in states of panic or drowsiness, the ability of the car to respond to manouvers induced by the driver to avoid a certain circumstance. Generally, statistics indicate that time intervals involved in sudden changes in normal traffic situations are relatively smaller than the average driver's response time. The Police, Ambulance, Fire-Engine (PAF) vehicles emitting their siren sound is an example of informing drivers to change their course of motion by slowing down and deviating to one side of the road thus giving way to the PAF vehicle. Such a state of affairs should take place in an ordered fashion otherwise one should expect accidents and taking in consideration that PAFs drive relatively fast giving rise to a 'rush' situation. Now, what happens if one or more driver fails to identify the siren sound on time and/or fails to specify the right direction of approach ? such a driver(s) will give rise to a sudden change in the traffic situation when surprised by a PAF and his response becomes unpredictable.

Statistics indicate that such drivers exist since CAR-PAF accidents occupy a significant fraction of traffic accidents. A large part of that fraction is due to the facts mentioned above. The reasons behind these facts could be attributed to:

(1) Drivers state of awareness drivers with low state of awareness mainly belong to:
   the class of people with hearing disability or hearing impairment in general;
   the class of elderly people that usually have less concentration on the road dynamics of change;
   the class of non-experienced people as the first time on the road drivers who are favorable to a panic state of mind when they experience all of a sudden situation on the road;
   the class of people that abuse alcohol and drugs;
   the class of people that reach a fatigue state from long distance driving as for instance commercial truck drivers;

(2) Drivers driving habits
   having the habit of listening to loud music while driving as the case with most teenagers drivers thus screening external sounds as the PAF siren sound;
   having the habit of talking with others or getting indulged in some other sort of activity that would distract their attention;

(3) Drivers vehicles conditions:
   all the situations could be aggravated if the cars are provided with sound proof windows as the case with modern ones that are usually closed in winter and in summer to maintain the air conditioning on.
   internal sounds like sounds generated by heating-fan system and/or the the windshield wipers that would screen external sounds;

(4) Road/weather/area conditions:
   driving in noisy areas could screens significant sounds as that of the siren;
   echo or sound reflection effects of the siren sound usually causes confusion in deciding the right direction of approach;
   driving in stormy weather. The sound produced by thunder storms and heavy rain, plus that of the wipers, give rise to noisy background that would severly attenuate the siren sound, not to mention snow storms that affects the acoustics properties of the air and the ever-present broad-band wind noise.

The inability to detect the sound of a PAF vehicle due to any of the above mentioned factors may result in fatal or serious injuries as the case when a PAF vehicle attempts to cross redlights assuming that the other cars are aware of its presence, and another car is speeding to cross the greenlight unaware of the presence of the PAF vehicle. There are more cases to mention.

Also the inability to specify the direction of approach of a PAF siren results in serious accidents as the case when a driver identifies the siren sound but assumes the wrong direction of approach of a PAF vehicle suddenly finds the PAF in an unexpected site obliged by law to give way to the PAF vehicle and in a state of panic could take sudden moves causing other cars behind him to crash in a chain of collisions or simply colliding with the PAF or other nearby cars. On the other hand, even the minor effects of such accidents may cause delay of an Ambulance or failure of a Police vehicle to accomplish its duties on time. When the number of combined factors render it difficult to recognize the PAF siren sound and/or determine its direction of approach using our natural perceptions then it becomes inevitable to have an early warning system that can reliably aid the vehicles operators by alarming them and getting their attention in time thus eliminating the element of surprise. The presented invention actually solves these problems.

2. Description of Prior Art

Efforts at providing devices for alerting vehicles operators of the presence of emergency vehicles have been taught in the past. In fact, several patents have disclosed techniques employing non-audio sensing means that detect radio signals emitted by radio transmitters located in the emergency vehicle and receivers located in the other vehicles or in traffic lights. Such sensing means are expensive and require the installation of more than a device. For example U.S. Pat. Nos. 3,233,217; 3,673,560; 3,710,313; 3,760,349; and 3,412,317.

Other patents adopted the use of a bank of filters and threshold detectors for the detection of specific signals and that has been known for more than three decades. The drawback of such a technique is that the hardware is built and tuned for the recognition of one sound pattern, based only on its frequency characteristics. The performance of the patents based on that technique with regard to the rate of false alarm or rate of miss deteriorates in the presence of noise. An example of these devices is depicted in U.S. Pat. No. 4,212,085 in which the bank of filters consists simply of one high band pass filter followed by a level detector. The direction of the incoming vehicle is determined by using three of such circuits connected to three microphone elements. The direction is then indicated by either the LED of highest brightness or by using a comparative logic. In such simple technique no attempt is made to use the specific features of the siren sounds, hence any audio signal of strong frequency component in the frequency range of the high bandpass filter, such as an automobile horn, can produce a false detection.

A similar approach is also described by Warren in the U.S. Pat. No. 4,587,522, where the output of a bandpass filter is squared and used to drive a pulse counter. A timer means is then used to provide an alarm signal if the pulse count rate falls within a specified range. This technique has better performance than the preceding one with respect to the background noise since a squarer circuit tends to emphasize the time-domain signal peaks over the background noise level. However the technique can not still differentiate between signals having frequency components within the bandpass filter. Moreover, the squaring signal tends to spread the frequency components of the signal, a signal having two strong frequency components, say $w1$ and $w2$, will have the same effect as a signal at $w1+w2$ and $w1-w2$, or $2w1$ and $2w2$. It is clear from the above discussion that the described patents are not reliable warning systems for two main reasons. First, the siren sound does not have a narrow frequency band, but sweeps a rather wide frequency range. For example, the audio characteristic of the sirens "yelp" mode consists of a continuously changing audio tone that begins at a frequency as low as 500 Hz and sweeps to a frequency as high as 1600 Hz and then sweeps back down again to the starting low frequency. The sweep cycle is repeated at a rate between 5 to 4 cycles per second. The exact frequency range covered and exact cycles repetition rate depends on the particular type of siren. Other siren operating modes known as "wail" and "high-low" have different audio characteristics. The second reason is that most street noises have a complex frequency spectrum that contains many audio components of different frequencies and these noises would cause almost constant false triggering, rendering the device useless, as for instance electric horns on automobiles, air horns on trucks, the screetching of brakes, the squealing of tires, engine exhaust noise, tramway or train whistles and the ever present broad-band wind noise.

An improved technique is described by Jensen in the U.S. Pat. No. 4,625,206. Unlike the previous ones, it utilizes information based on the siren sound frequency features, specifically the "yelp" mode. The circuit comprises a bank of bandpass filters and a plurality of timing and logic circuits to detect the presence of frequency components in the incoming signal that match that of the "yelp" siren sound according to a specific timing and sequence. The circuit represents a significant improvement over the other patents. The timing circuits are chosen to match an average "yelp" sound. Jensen technique utilizes only the frequency-time envelope characteristics for sound pattern discrimination. Hence can be used for detection of signals with constant amplitude-time envelope. Signals with the same frequency-time envelope but with different frequency-amplitude-time characteristics can not in general be discriminated using the above mentioned technique due to Jensen. The Jensen patent aims at controlling traffic lights. A serious drawback of this approach is the possibility of changing the traffic lights at near by intersection inspite of the fact that the emergency vehicle may not be heading towards that intersection. Strong reflections of sounds inside high rise metropolitan areas can cause wrong detection of the direction of approach of the emergency vehicle, and cause serious chaos at the intersection. It is more safer to install the receivers inside the motor vehicles where operators may perform second verification and exercise extra precaution. Moreover in many cities traffic lights are concurrently synchronized and controlled by a central computer to optimize the traffic waves across the city, overridding and perturbing the operation of such synchronized systems can cause long periods of traffic jams. One more aspect of Jensen's patent is direction finding where he utilizes differential discriminator technique similar to the one taught by Kyle in U.S. Pat. No. 4,591,834. The differential amplifier detects the difference between the signals from two oppositely directed microphones. That is the output voltage is then given by $$V = G(S_1 - S_2)$$

if $S_1 - S_2 > \delta$ and $$V = 0$$

if $S_1 - S_2 \leq \delta$

The advantage of this technique is that it cancels the effect of common noise. The disadvantage is that if the siren sound level is equal at both the sensors, example the emergency vehicle is very close, the system might fail to give any indication of its presence. A common disadvantage of all the prior art is that if the noise level is higher along one direction it can jam and confuse not only the direction determination capability, but the signal detection and the discrimination ability.

SUMMARY OF THE INVENTION

It is the objective of this invention to present a low cost microcomputer based device that can be installed in vehicles such as automobiles, trucks, buses, etc. which identifies the siren sound emitted by a Police, Ambulance or Fire-Engine vehicles (PAF), out of many different sources of sound emitting at the same time in the ambient environment, indicates the PAF direction of approach and alert the vehicle's operator by visual as well as sound means. The invention has other applications that will be explained subsequently.

It is light weighted, relatively small in size, can be installed in the gauge panel of any car. It is a safe device and absolutely harmless. Its response speed can be easily enhanced, it is operated by one switch on-off button, it is easy to repair and doesn't require frequent servicing and adjustments. It has great social benefits; helps those with hearing disabilities and hearing impairment to detect PAF siren sounds, and presumably will reduce CAR-PAF accidents and reduce the mean transport time of a PAF vehicle to its destination.

The technique used in identifying the sound is based on template matching in which the invention during the detection mode (the HUNTING MODE) continuously models the incoming sound stream via a time varying digital filter and compares it with prestored templates representing the siren sound of PAF vehicles. This is done by sliding the input sound stream past the reference templates in a continuous fashion with due regard to the time registration. This is achieved through a "Dynamic Programming Procedure" that dynamically will compare the frame sequence of the incoming signal with the frame sequence as stored in the template. The "Dynamic Programming" is necessary to account for the frame misalignment and frame length variation in the incoming signal. In the presence of no target signal, the invention continues to build and update a model for the environment noise (based on the stored noise model) and compares the new signal alone with the stored template. If the incoming sound and the reference templates are sufficiently similar over some period of time a matching is issued and the invention indicates the presence of a siren at that time.

The prestored templates are generated during the programming mode (the TRAINING MODE) of the invention in which a reference signal for the one to be detected or identified is measured by the device. The signal period is then divided into time frames, say 20 to 50 millisecond length. Then the reference model parameters of the digital filter representing the signal during this period is obtained by a Least Square Error method called Linear Prediction Technique. The set of parameters is then stored in a fixed memory in the form of a table or a template.

The direction of the incoming signal can be identified by using for example four sensors (or microphones) that are mounted back-to-back, each one covering a 90 degree sector. The average output level of the four sensors is computed and compared by means of a built-in algorithm. If the $i^{th}$ sensor-detected signal has the highest level and succeeds the reference template matching test, then the direction of that signal is easily determined from the knowledge of the location of the sensor hence the direction of approach of the siren-emitting PAF.

The techniques disclosed in our invention are totally innovative based on adaptive digital signal processing methods in which the signal is continuously modelled by a time varying digital filter based on all the frequency-amplitude-time information available, hence provides powerful signal detection and sound pattern discrimination capability.

The hardware in Jensen's technique is highly dependent on the particular signal to be detected while in ours the hardware as well as the software are totally independent of the signal to be identified. Hence our invention, in fact is a general purpose audio signal detector and sound recognitive device that can be easily programmed in the field for specific industrial and civil applications. While Jensen's technique requires a totally different application and extensive tuneup and adjustments for every application.

The ability to store templates for a number of signals enables to identify different versions or modes of the same signal. For example templates for the different siren modes can be stored and identified in the same time. Jensen patent must be tuned to only one mode of the signal unless duplicate hardware is used.

By using physically different reference signals in the training mode we can generate new reference templates which correspond to these physically different sounds by comparing the incoming signal with more than one template at a time enables our device to be used to detect and identify one or more out of several possible signals and hence the invention can be used for other purposes:

(a) to identify abnormal sounds at unattended or even attended areas or places as inside homes, offices, factories, trains, airplanes . . . etc., like electric sparks sounds which can be detected and identified when the device is placed near multiple-outlet power strips, high voltage power supplies . . . etc. Also it can detect sounds produced by gas leakage which may give rise to explosions, in this case the device acts as a watchman.

(b) to identify irregular sounds in car engines and/or the brake-system, or any other machine, in that case it acts as a diagnostic device.

(c) to identify sonic and ultrasonic sounds emitted by Fish/Birds Schools or Sea Mammals in lakes, seas and oceans and their direction of motion.

(d) to identify sounds emitted by engines such as propulsion or jet engines, submarines etc.

(e) to identify sounds emitted by the breaking of glass in houses or cars break-ins, in this case it acts as a watchdog;

(f) to control the condition of a traffic light signal at an intersection. Once the invention identifies the siren sound it will produce a signal to swap the traffic lights in accordance to the direction of approach of the emergency vehicle relative to the intersection;

(g) a multipurpose device can be built to serve most of the above mentioned purposes.

Clearly the scope and the concept of the device presented here are completely new and different from the known techniques of signal detection including the inventions cited above. Further objects and advantages of our invention will become apparent from a consideration of the drawings and ensuing description of preferred embodiments thereof.

DESCRIPTION OF THE PREFERRED EMBODIMENTS

External Description

Figure 1:
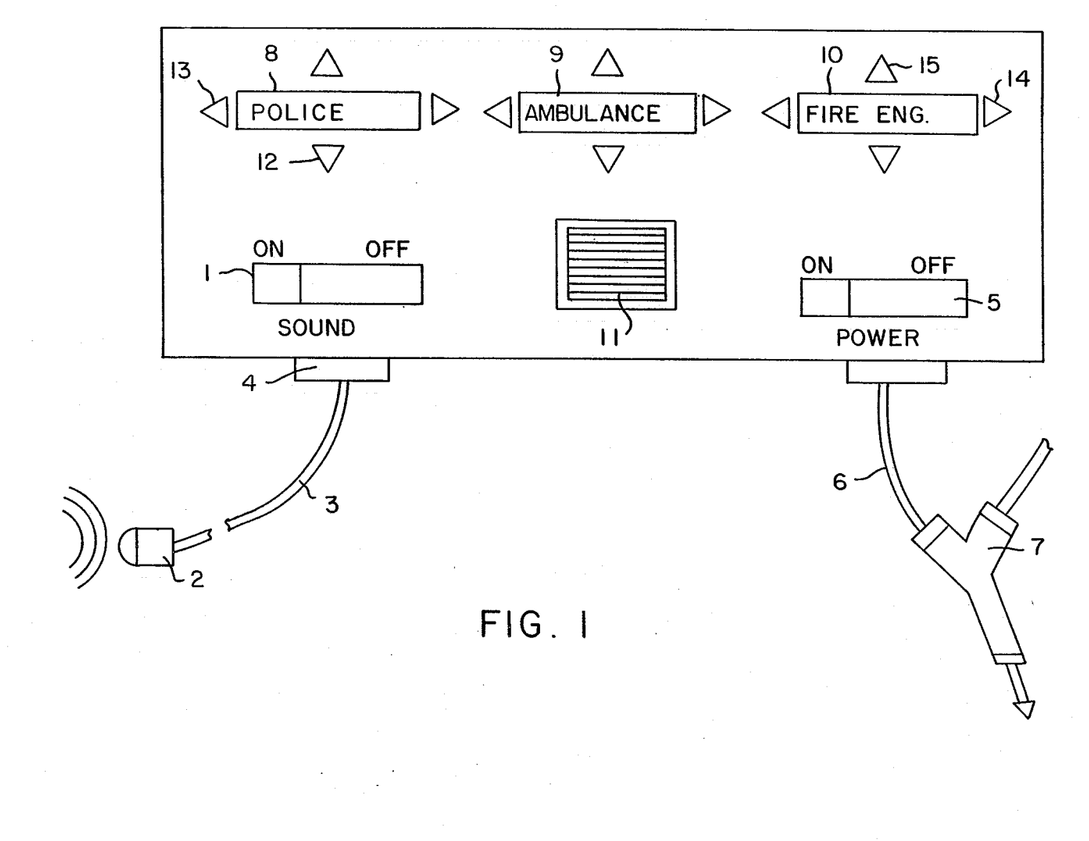
FIG. 1 is a front view of one interface displaying visual information.

The front face of the invention is shown in FIG. (1), which consists of three light-indicated labels, namely, Police, Ambulance and Fire Engine (8), (9) and (10) respectively. There are also four light-indicated arrows for each label namely to specify the direction of approach of a PAF vehicle, the lower arrow (12) is designated to the backward approach, the left arrow (13) is designated to the leftish approach, the right arrow (14) is designated to the rightish approach and the top arrow (15) is designated to the forward approach. A label or an arrow is written in such a way that it will not be normally readable until a background red light underneath the former or yellow light underneath the latter is turned on when the invention detects the right signal. The redlight or the yellowlight is produced by a special light emitting diode LED underneath each label or arrow respectively. (11) is a sound output means which produces a beep sound when any of the labels (8), (9) or (10) and any of the accompanying arrows (12), (13), (14) or (15) are turned on. The beep sound can be shut off separately by the on/off slide switch (1). The four microphones are usually installed outside the vehicle and each is connected to a coaxial cable (3) and a plug (4) to the main enclosure of the invention. The microphone element (2) (only one is shown) is mounted inside a protective small plastic cabinet and screened in such a way as to protect the sensitive element against rain, dust and snow. The microphone is also surrounded by a foam jacket to reduce the noise effect of the winds. The invention can be totally turned off by the on/off switch (5). The power is fed to the system by splitting the cable feeding the vehicle's radio by a Y connector (7) as shown in FIG. (1). The invention can also be powered separately by battery means. Not shown in the front view a switch in the rear part of the enclosure of the invention that is used to select the mode of operation of the system as a training or hunting mode.

Description of the Mechanism of Operation

Figure 2:
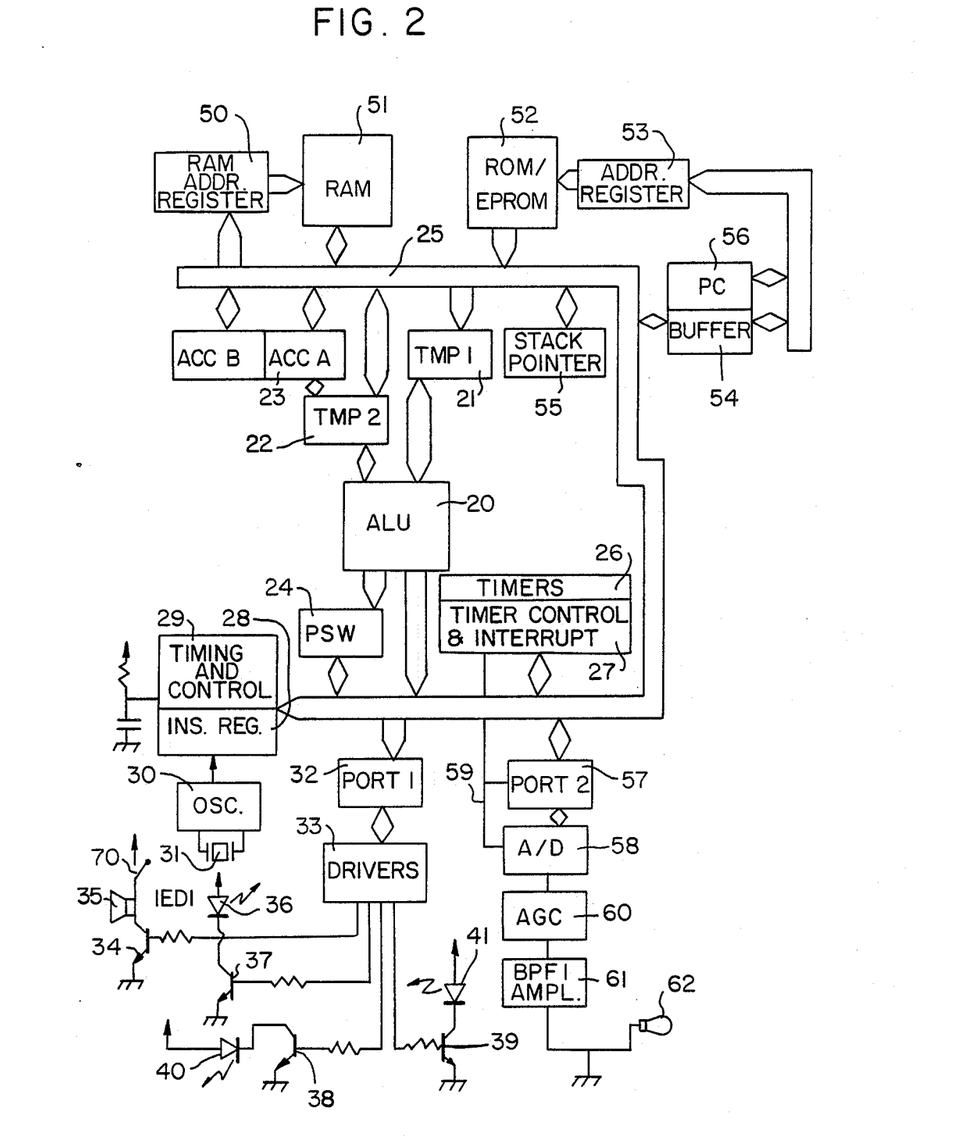
FIG. 2 indicates a block diagram of a signal detection and processing circuit employed in the signal adaptive processor according to the invention.

The first step in the mechanism of operation of S.S.S. is sound reception. FIG. (2) indicates a block diagram of S.S.S. according to the invention.

The microphone element (62) converts the sound waves into electrical signals which are then transmitted through a coaxial cable to a Band Pass Filter (61) which amplifies the signal and limits its frequency band to approximately 400 Hz to 1800 Hz. The signal is then further amplified through an Automatic Gain Control stage (60).

Figure 3:
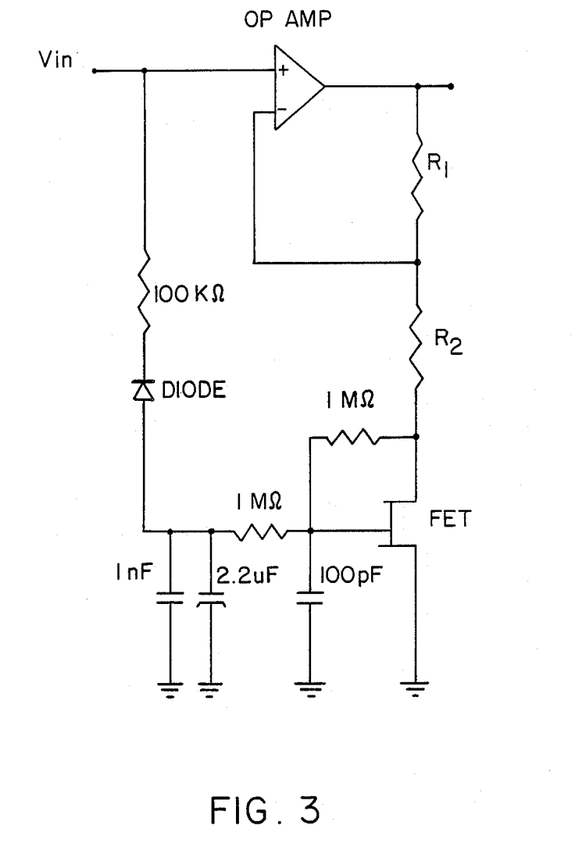
FIG. 3 is an electronic schematic shows how the gain of the AGC circuit is made to change slowly to respond to the average magnitude of the signal rather than its instantaneous value.

The AGC stage is such that its gain decreases for large signal levels to prevent saturation of the A/D converter (58). In the meantime, low-level signals are amplified enough so that the signals continue to occupy the full dynamic range of the A/D converter. The gain of the AGC circuit is made to change slowly to respond to the average magnitude of the signal rather than its instantaneous value. FIG. (3) shows a schematic of such a stage. The signal is then converted to a digital code by an Analog to Digital Converter A/D (58). The analog signal is sampled at 2K samples/sec. The digital value is then stored temporarily in a latch in port 2 (57) until it is read by the device logic for further processing.

The technique used here in this invention is similar to some word-spotting algorithms used in recognition of specific words in continuous speech, however the algorithm has been modified by the inventors to meet the particular characteristics of the siren sounds. The algorithm is also enhanced by a novel adaptive filtering means which identifies the background noise features and then filters it out before extracting the features of the sound in the incoming signal stream. This feature is essential to ensure reliable operation in such noisy environment as streets and highways.

The third step in the mechanism of operation following sound features extraction is pattern similarity measurement.

A reference template consists of one or more frames of sound features, each frame corresponds to 50 milliseconds (50 ms) of the original reference sound. Thus 20 of these frames are needed for each one second of the reference sound. Although the sound features are taken to be the linear prediction coefficients, the linear prediction parameters are not stored in the templates, instead, the autocorrelation coefficients and the linear prediction residual error are stored in the template's frame data. Let us first introduce the following notations:

$r_T(k, m, j)$: the $j^{th}$ autocorrelation of the $m^{th}$ frame in the $k^{th}$ template.

$r_n(j)$: the $j^{th}$ autocorrelation of the background noise.

$r_m(j)$: the $j^{th}$ autocorrelation of the measured signal.

$r_s(j)$: the $j^{th}$ autocorrelation of the input signal.

$R_T(k,m)$: the autocorrelation matrix of the $m^{th}$ frame in the $k^{th}$ template.

$\bar{r}_T(k,m)$: vector of the autocorrelation of the $m^{th}$ frame in the $k^{th}$ template.

$\underline{a}_s(j)$: the $j^{th}$ linear prediction coefficient of the signal.

$\bar{a}_s$: vector of the linear prediction coefficients.

$E_T(k,m)$: the linear prediction residual error of the $m^{th}$ frame of the $k^{th}$ template.

$T(k,m)$: the threshold value for the total similarity value between the input sound and up to the $m^{th}$ frame of the $k^{th}$ template.

Figure 4:
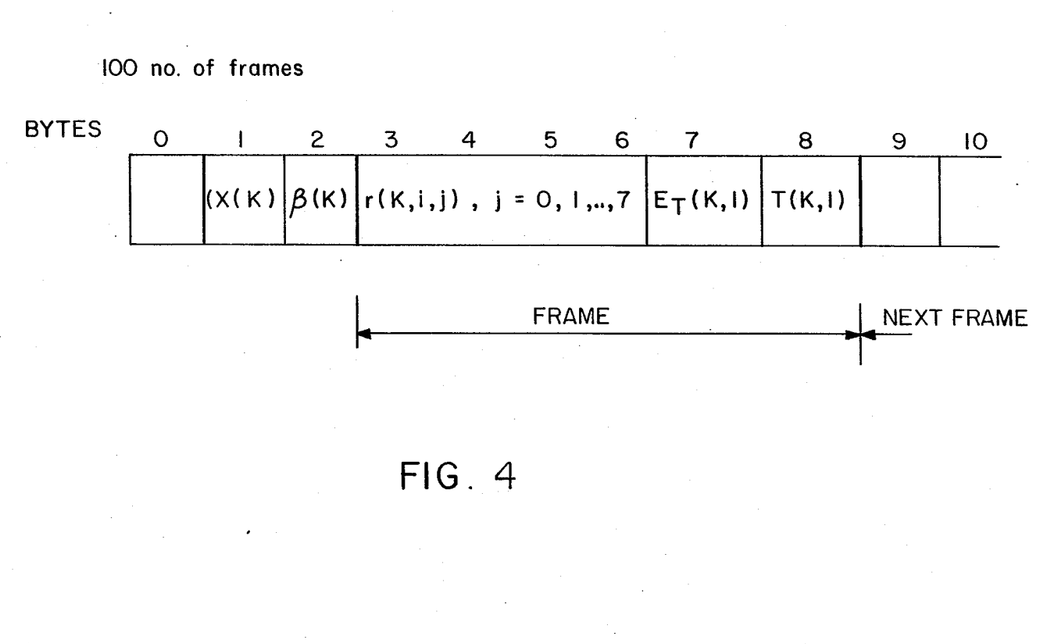
FIG. 4 shows the format of templates storage.

Now we examine the format of the templates as depicted in FIG. (4).

The first byte in the template, byte 0, contains the number of the frames in the template. The first byte and the second byte contain the parameters $\alpha(k)$ and $\beta(k)$ which are used in computing the total similarity. Each frame requires 6 bytes to store the frame features.

The autocorrelations are stored in the first 4 bytes. The autocorrelation coefficient is quantized to occupy 4 bits. Following the autocorrelations is the linear prediction residual error $E_T(k,m)$ which occupies one byte. Finally T (k,m) is stored in the last byte of the frame.

Three templates are used for each siren. That is to say 3 templates are used to account for the different sound modes of the same siren. The three templates corresponding to a certain siren will actually be treated as a one dynamic template as it will be explained shortly. The incoming sound stream is processed by the invention in the same fashion as the reference templates, however, the invention performs all the computations on-line. At every sample period the device enables the A/D converter to start conversion, then latches the digital code in port 2. The device then reads the measurement $Y_m(t)$ from port 2 and stores it in a signal measurement vector. $\overline{Y}_m = [Y_m(t), Y_m(t-1), \ldots, Y_m(t-8)]$. The device also update the autocorrelation of the measurements as follows:

$$\gamma_m(j) = \beta_m r_m(j) + (1-\beta_m) Y_m(t) Y_m(t-j)$$

where j=0, 1, 2, ... 8.

The above calculations are performed every 500 microseconds by the same interrupt service routine which reads the A/D converter. Every 50 millisecond the background job of the device takes these autocorrelations $r_m(j)$ with j=0, 1, ..., 8 for further processing. The signal autocorrelation coefficients are obtained by subtracting the noise correlations from the $r_m(j)$ with j=0, 1, ..., 8 i.e.

$$r_s(j) = r_m(j) - r_n(j) \quad j=0, 1, 2,$$

The linear prediction algorithm given in Appendix A is then applied to $(r_s(j), j=0, 1, \ldots, 8)$, to obtain the linear prediction coefficients of the signal, that is $a_s(j)$ j=1, 2, ..., 8. These values are used to evaluate the similarity between the current signal frame and frames of the templates as it will be explained soon. If the matching procedure fails or 3 consecutive frames, the input signal is considered to be free from any siren sound and hence consists solely of the street noise. The autocorrelation of the background noise $r_n(j)$ are then updated by the autocorrelations of the measurement, i.e., $$r_n(j) = r_m(j) \quad j=0, 1, \ldots, 8$$

The similarity measure between a given frame of input sound and the $m^{th}$ frame of the $k^{th}$ template is defined by:

$$d(k,m) = E_T(k,m)/E_s(k,m)$$

where $E_T(k,m)$ is the stored value of the linear prediction residual error of the $m^{th}$ frame in the $k^{th}$ template. $E_s(k,m)$ is defined by the following operation:

$$E_s(k,m) = \sum_{j=0}^{8} a_s(j) \sum_{l=0}^{8} r_T(k,m, |j-l|) a_s(l)$$

Figure 5:
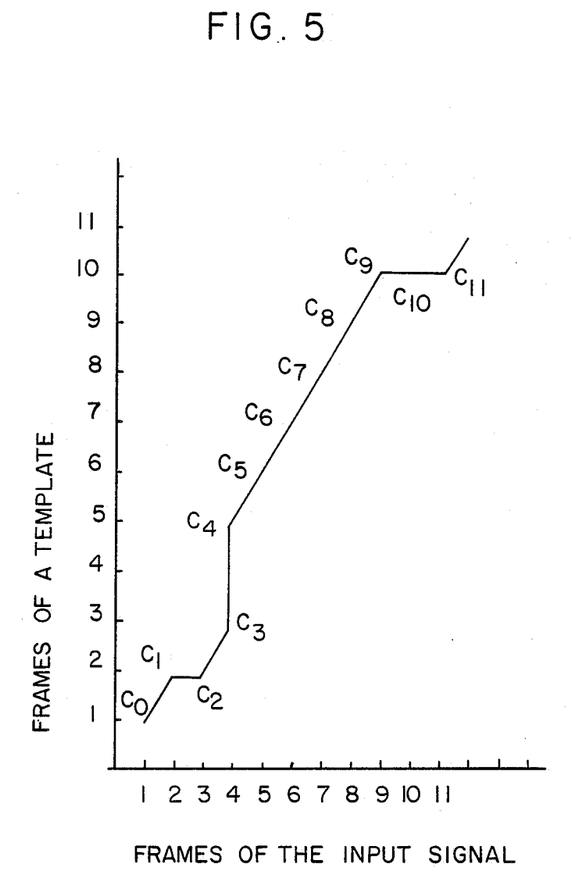
FIG. 5 shows a typical time registration path.

The last quantity is such that the closer the match the closer $E_s(k,m)$ to $E_T(k,m)$. Thus the similarity d (k,m) attains its maximum when there is strong similarity between the input signal and the template. S.S.S. utilizes a dynamic programming approach to overcome the time registration problem between the input signal and the stored templates. The dynamic programming procedure creates a time registration path consisting of the best local match between the frames of the input signal and the frames of a given template. FIG. (5) shows a typical time registration path. The vertical scale corresponds to the stored reference template, the horizontal scale corresponds to a portion of the incoming sound. This path connects the best locally matched frames. For example $C_1$ on the path is found to be the best of the points (1,2), (2,2), (2,1). Similarly $C_2$ is found to be the best point among the coordinates (2,3), (3,3) and (3,2). If the total similarity measure at any point is found to be too low the matching procedure is terminated. Let us define L (R,m,n) to be the total similarity function over the time registration path.

$$L(R, m+b, n+a) = \max[(1 - \beta(k)) L(k,m,n) + a \cdot \beta(k) d(k, m+b, n+a)]$$

$$\text{where } (a,b) = \begin{cases} (1,1) \\ (1,0) \\ (0,1) \end{cases}$$

$$a = \begin{cases} 1 & \text{if } (a,b) = (1,1) \\ \alpha(k) & \text{if } (a,b) = (1,0) \text{ or } (0,1) \end{cases}$$

$n = n + a$
$m = m + b$

If $L(k,m,n) \leq T(k,m)$   stop, don't issue a match

If $m = M(k)$   (end of the template)
  ←Goodmatching return OK code

If $(a,b) = (0,1)$   repeat until $a = 1$

Since the siren sound is repetitive if matching of a complete template is achieved, then there is a large probability that the net portion of the incoming sound would be the continuation of the same siren sound. To account for this fact the templates of this siren will be credited by scaling down their threshold T(k,m) by a factor between 0.75 to 0.9. At the beginning of the time registration path we compute the set of similarity measures $$d(k,1,1) \text{ for } k=1,2,\ldots,9$$

between the first frame of the input signal and the first frame of the templates. We then select the largest of these frame similarity measures.

$$d(\hat{k},1,1) = \max d(k,1,1)$$

where $\hat{k}$ is the value of k which maximizes d and d (k,1,1) is taken to be zero if its value turns out to be less than the threshold T (k,1). If all d (k,1,1) are zeros, then no matching occurs and the device waits for the next input frame, otherwise the first frame of $k^{th}$ template which yields d max is chosen as the first frame in the time registration path. The calculation of the time registration path proceeds then as explained before, except that the templates corresponding to the detected siren sound will be considered as a composite dynamic template. The frames from those templates are considered in choosing the best next point in the path.

APPENDIX A

Given the autocorrelation coefficients $r_s(j)$, $j=1, \ldots, m$ find the linear prediction coefficients $a_s(j)$.

```
K₁ = r₂/r₁
a₁ = 1
a₂ = K₁
α = r₁ + r₂/r₁

Do 50    J = 2,m
         s = 0

Do 30    JJ = 1,j
         N1 = J - JJ + 2

S = S + r (N1) * a (JJ)
KJ = -S/α
N2 = J/2 + 1

Do 40    JJ = 2, N2
         N3 = J - JJ + 2
         a = a (JJ) + KJ * a (N3)
         a(N3) = a (N3) + KJ * a (jj)
         a(JJ) = a
         a(J + 1) = Kj
         α = α + Kj * S
```

Internal Description

The detailed description and specification examples are given here below while indicating preferred embodiment of the invention are given by way of illustration only since various changes and modifications within the spirit and scope of the invention will become apparent to those skilled in the art from this detailed description. As shown in FIG. (2), the invention consists of a microprocessor which contains a program counter PC (55) which points to the address of the next instruction to be executed. This instruction is stored in the program READ ONLY MEMORY ROM (52).

There is also a random access memory RAM (51) used as temporary storage, a timing and control unit (29) and an arithmetic and logic unit ALU (20) with hardware binary multiplication logic. There is also a primary accumulation ACC A (23) and a secondary ACC B (23) program status word PSW (24) and a timer-counter unit (26). Data move inside the device through the internal Bus (25). The stack pointer (56) points to a memory segment in the RAM (51) which is used as a last-in first-out memory to save the contents of the PC and other registers during interrupts and subroutine calls. The buffer (54) is used to access lookup-table data stored in the ROM and also to save the PC contents or to load a new value to it as is the case during jump, interrupt, call and return instructions.

The device performs all its functions synchronously by executing sequential instructions stored in binary code in the ROM (52).

The address of the next instruction to be executed is always stored in the PC (55). Each instruction cycle starts by sending the contents of the PC (55) through the address register (53) to the ROM. The ROM is then enabled and the instruction's binary code is transferred to the instruction register IR (28) via the Bus (25) where it is decoded into a sequence of synchronized operations by the timing and the control unit (29). The timing and control unit (29) sends enable/disable commands to the various elements connected to send or receive data through the Bus (25). For example, to perform ADD A+M→A to add accumulator A to a memory location M and store results in A, the address of the ROM location is transferred to the RAM address register (50). The contents of this RAM location is now transferred to TMP1 register (21) in the same time the ACC A is transferred to TMP2 (22). Then the output of the ALU and MULT unit (20) is transferred to the Bus (25) back to the ACC A (23). The device communicates with the other units through port 1 and port 2. Port 2 (57) is an input port only which latches the output of the A/D converter (58).

Both the A/D converter and the latch are enabled by timing signals under software and hardware control. Port 1 consists basically of 4 output lines. The four lines are buffered to device transistors.

One of these transistors control a beep generator (35). The switch (34) is used to shut off the beep sound. The transistors (37), (38) and (39) control the light emitting diodes (36), (40) and (41) respectively which correspond to the labels for police, ambulance and fire-engine respectively. The direction of the incoming signal can easily be determined using well known techniques. For example four sensors (or microphones) can be mounted back-to-back each one covering a 90 degree sector. The average output level of each of the four sensors is computed and used to decide the direction of the incoming signal. In our approach the average signal is defined by $$S_{av}=(S_1+S_2+S_3+S_4)/4 \qquad (1)$$

We also define the signals $U_1$, $U_2$, $U_3$ and $U_4$ as follows $$U_i=S_i-S_{av} \qquad (2)$$

$i=1,2,3$ and 4.

In one approach the average power of $U_i$ is continuously computed and the signal $U_i$ corresponding to the largest is used to compute the frame parameters (as depicted in the patent material). It can be shown analytically that formula (2) has an advantage over the differential detection scheme used by Jensen in the prior art, however it can be shown also that our scheme achieves a significant improvement in the signal to noise ratio, that it has improved immunity against directive noise (noise from one direction).

A more powerful approach is to build simultaneously and independently a signal model for each direction based on the signals $U_i$ as described in the patent material. The direction which yields the largest similarity measure is taken as the proper direction.

This disclosed technique ensures proper detection and direction identification even in the presence of a very high noise in one direction, for example a passing truck or bus next to a vehicle carrying the device, that exceeds the siren signal level coming from another direction.

Figure 6:
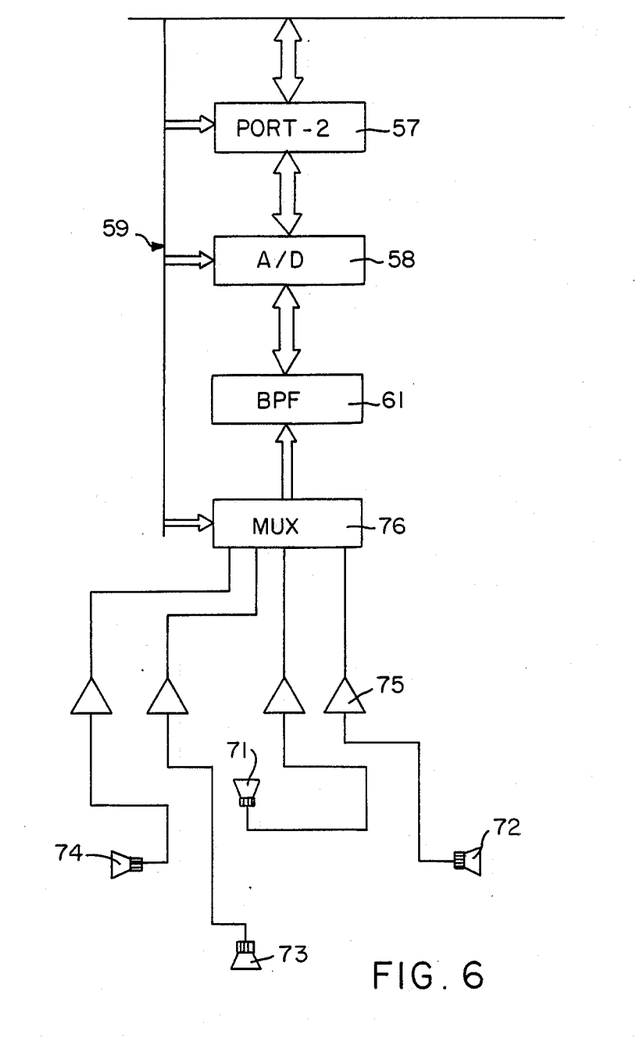
FIG. 6 shows one implementation for direction finding.

To implement our direction finding techniques the elements labelled (57), (58), (59), (60), (61) and (62) can easily be modified as shown in FIG. (6). The microphone elements (71), (72), (73) and (74) have a directional reception pattern and are mounted on the front, right, back and left of the vehicle respectively. (75) are low noise preamplifiers. The output from these preamplifiers are time division multiplexed using the analog multiplexer (76). The output from (76) is bandlimited by the band pass filter (61). The filter emphasizes the frequency band relevant to the signal to be detected and acts as an anti-aliasing filter providing at least 60 dB attenuation higher than half the sampling rate. (58) is as before an A/D analog to digital converter which converts the analog signal to a binary number that can be read by the CPU via port 2 (57). The timing and control signal (59) ensures synchronization between the multiplexer, the A/D converter and the CPU.

While the above description contains many specificities, these should not be construed as limitations on the scope of the invention, but rather as an exemplification of one preferred embodiment thereof. Many other variations are possible.

For example:

As related to the external features, the console in FIG. (1) can contain one LED for one label PAF instead of three labels (8), (9) and (10) and hence reduce the arrow direction indicators (12), (13), (14) and (15) from twelve in number to only four. Also a pilot light may be included to indicate the console in operation.

As related to a dual purpose device, by storing more templates in the programming mode that represents audio signals produced by the breaking of glass the breaking glass produces two distinctive sounds: An initial burst of sound in the low-frequency range of 6,000 to 10,000 Hz, followed by a secondary "tinkling" wave of sound at a higher frequency of about 12,000 Hz. The invention with its four exterior sensors that cover the four directions hence the four glass windows of any vehicle and with the dynamic autocorrelation technique adopted can detect both low- and high frequency bursts in the correct order, that of course requires the filter (61) in FIG. (6) to allow a frequency band relevant to the siren as well as the breaking of glass signals and to use the separate power supply as mentioned in the external description earlier.

In case of tampering with the exterior sensors, an extra sensor may be installed inside the vehicle at the top or even at the gauge panel, or three of the four exterior sensors are retained externally and one of them is kept inside the vehicle presumably the front one. In any case one sensor is enough inside the vehicle since direction-based information is irrelevant in these situations. Also in case break-in takes place using a glass cutter the invention can easily identify the sound produced by the cutter sliding over the glass surface. Thus the invention besides being a siren sensor can also be a glass-break sensor and be used not just as an early-warning device but also as a watch-dog.

As related to detection of ultrasound signals the invention can easily identify sound patterns in this frequency range by requiring the bandpass filter to allow a frequency band in this range. Thus it can identify sounds emitted by certain species of insects, mammals and even fish.

As related to direction sensing in an alternative embodiment, the analog multiplexing can be replaced by digital multiplexing where an A/D converter for each input is used. Thus four A/D converters may be used whose outputs are combined by digital multiplexing. A decision on the appropriate technique will have to make tradeoffs among the following factors; resolution of measurement, number of channels, speed of measurement, signal level and conditioning.

Accordingly, the scope of the invention should be determined not by the embodiment illustrated, but by the appended claims and their legal equivalents.

Accordingly, we claim:

1. An early warning system to alert vehicle operators of the presence of emergency vehicles which emit audio warning signals to indicate the type of vehicle and direction from which it is coming comprising:
   (a) a first means comprising of one or more analog to digital converters and a plurality of sensors and;
   (b) a first memory means for storing coded reference signals in fixed templates and;
   (c) a second memory means for temporarily storing a coded template of incoming signals and;
   (d) a third memory means for storing a coded template of the environmental noise and;
   (e) a second input means for selection of the mode of operation as a training mode or hunting mode;
   (f) an output means comprising an audio and visual message display means and;
   (g) a central processing means comprising an arithmetic logic means, plurality of accumulators and working registers, a timing and control unit, a program counter, stack registers, firmware stored in a fourth memory means; the central processing means operates in one of two modes as instructed by the said second input means; in the training mode the central processing means reads a reference signal via the said first input means, encodes it into templates according to an encoding algorithm stored in the said fourth memory means; the said templates are then stored in the said first memory means in an order selected by instructions from the said second input means;

in the hunting mode, the central processing means reads an unknown signal via the said first input means, filters the said signal using an algorithm stored in the said fourth memory means and using parameters stored in the said third memory means, then encodes the said unknown signal into templates according to an encoding algorithm stored in the said fourth memory means; the said templates are then stored in the said second memory means; the said central processing means then compares the template of the incoming unknown signal against the templates stored in the said first memory means and according to a comparison algorithm stored in the firmware in the said fourth memory means; if matching is found the central processing means sends an audio visual signal via the said output means; if no matching is found the template of the said incoming unknown signal is used to update the template stored in the said third memory means.

2. A processor for adaptive signal detection according to claim 1, wherein a measured signal via the said first input means is divided into one or more time frames, and wherein parameters of a model of the signal for each time frame are computed, and wherein the said signal templates comprise tables for the parameters of the said signal model of each signal time-frame.

3. A process for adaptive signal detection according to claim 1 wherein the said firmware comprises a Dynamic Programming method for matching the template of the said incoming unknown signal with the said reference templates.

* * * * *